United States Patent [19]

Holtzman

[11] 4,307,434

[45] Dec. 22, 1981

[54] MULTI-SECTION CAPACITOR HAVING CONTINUOUS FOIL STRIP INTERCONNECTIONS BETWEEN SECTIONS AND METHOD OF MAKING THE SAME

[75] Inventor: Barry L. Holtzman, Ellettsville, Ind.

[73] Assignee: Westinghouse Electric Corp., Pittsburgh, Pa.

[21] Appl. No.: 92,869

[22] Filed: Nov. 8, 1979

[51] Int. Cl.³ ............................................. H01G 1/147
[52] U.S. Cl. .................................. 361/328; 29/25.42; 361/307
[58] Field of Search .............. 361/306, 275, 307, 328, 361/329; 29/25.42

[56] References Cited

U.S. PATENT DOCUMENTS 3,878,441  4/1975  Skinner ............................... 361/306

FOREIGN PATENT DOCUMENTS 316104  11/1919  Fed. Rep. of Germany ...... 361/329
1170076   5/1964  Fed. Rep. of Germany ...... 361/275
613670  12/1948  United Kingdom ................ 361/306
943910  11/1963  United Kingdom ................ 361/307

Primary Examiner—Elliot A. Goldberg
Attorney, Agent, or Firm—G. H. Telfer

[57] ABSTRACT

Wound capacitor sections having interconnections between their electrodes are provided wherein each interconnection comprises a conductive sleeve within a first section in conductive contact with one of its electrodes and a conductive foil tab within another section in conductive contact with one of its electrodes, the tab having an end inserted within the sleeve of the first section.

5 Claims, 6 Drawing Figures

MULTI-SECTION CAPACITOR HAVING CONTINUOUS FOIL STRIP INTERCONNECTIONS BETWEEN SECTIONS AND METHOD OF MAKING THE SAME

BACKGROUND AND SUMMARY OF THE INVENTION

This invention relates to capacitors, and particularly roll-wound power capacitors, in which conductive interconnections are required between capacitor sections.

A capacitor unit for relatively high power applications normally comprises within a single enclosure a plurality of capacitor sections that are mutually interconnected in parallel and/or series combination to achieve the desired capacitance. The nature and method of forming the conductive interconnections between capacitor sections is the particular subject matter of this invention.

In conventional commercial practice the capacitor sections are formed by rolling on a mandrel sheets of dielectric material and electrode foil material. During the winding, such as by proceeding with winding a predetermined quantity of material and then stopping, a tab of conductive material is disposed in the winding adjacent or at least in conductive contact with one of the electrode foils. The other electrode foil is similarly contacted, usually at some other location in the roll. Various arrangements are used including those in which a single electrode foil has more than a single tab in contact with it. The tabs are disposed so as to extend from the completed roll, such as by several inches, to permit subsequent operations. A plurality of sections are stacked and pressed to form a compact group that is taped and wrapped as a group and disposed within the capacitor can or other enclosure. It has been necessary before the impregnation and sealing of the capacitor to perform operations to interconnect the various conductive tabs with each other to form the desired conductive interconnections among the sections. Past practice has entailed the forming of a physical connection between tabs using thermal bonding techniques such as soldering or mechanical techniques involving various forms of connectors. These have generally been successfully performed but involve expense and, in the case of soldering, some operator skill in successfully performing the interconnections without damage to other elements of the capacitor.

In particular, for example, power capacitors frequently employ as one of the dielectric materials a plastic film, commonly polypropylene. While polypropylene has long been successfully used in power capacitors, it is recognized that thoroughness of impregnation by the dielectric liquid that fills the capacitor is desirable. This impregnation is facilitated in some structures by accompanying the polypropylene film layer by one or more layers of capacitor grade paper of an inherently more porous nature which provides a wicking action to permit entry of impregnant into the interior of the capacitor sections. There is present interest in providing all film capacitors in which the paper layers are not used. This can impose some extra difficulty in the impregnation step. The nature and manner of making the interconnections between sections can affect the ability to perform thorough impregnation, particularly in an all film unit. When soldered interconnections are formed, the soldered tabs are necessarily very close to the end of the capacitor section rolls themselves. The soldering in this area can, if not very carefully performed, cause heating of the end of the capacitor roll to the extent that a film dielectric material such as polypropylene will melt or fuse. The degree of this form of damage is not at all likely to be substantial in terms of the overall capacitor, but impregnation can be influenced because the fusing itself tends to seal the end of the section and will inhibit the entry of fluid dielectric therein.

It is therefore for the purpose of improved reliability as well as economy that the instant invention in the formation of interconnections between sections of a multi-section capacitor came about.

By the present invention, the conductive elements inserted in the roll include two general forms. One form is a conductive sleeve which may be and preferably is merely a sleeve of folded conductive foil material generally like that of the electrodes. The other of the interconnection conductive materials are simply conductive tabs that are located in other positions in these capacitor structures. By the present invention the section rolls including such elements at the desired locations, in accordance with past practice or any desired configuration for the interconnections, are stacked together and, where desired, the conductive tab free end is merely inserted into the extending conductive sleeve, in another section. The sections are then pressed so that among other things the conductive elements remain tightly contained, the sections are taped and wrapped as a group and placed within their enclosure.

Along with the ability to make interconnection between sections as described is that of making solderless interconnections within a section. That is, where desired to "short circuit" two points of the same electrode foil, such as to achieve lowered electrical power losses or lower inductance, the tab and sleeve in accordance with this invention may be used.

By this technique, soldering or an other form of physical interconnection is not required. The connection is formed by a continuous conductive tab extending from one location in a capacitor section to another.

DESCRIPTION OF PREFERRED EMBODIMENTS

Figure 1:
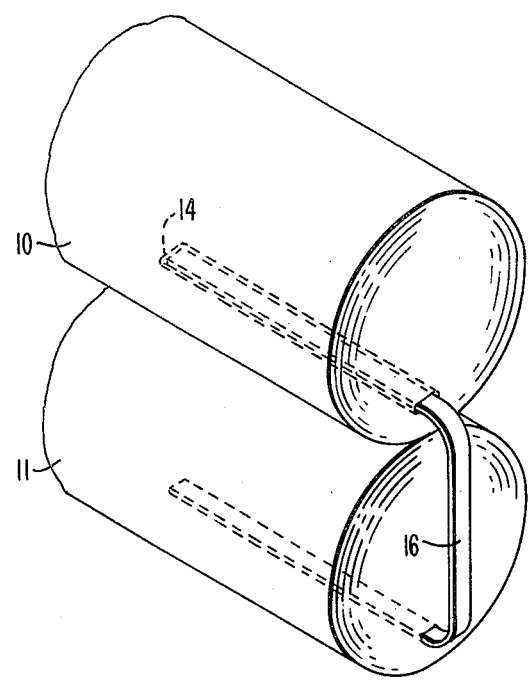
FIG. 1 is a schematic perspective view of a pair of capacitor sections interconnected in accordance with the present invention.
Figure 2:
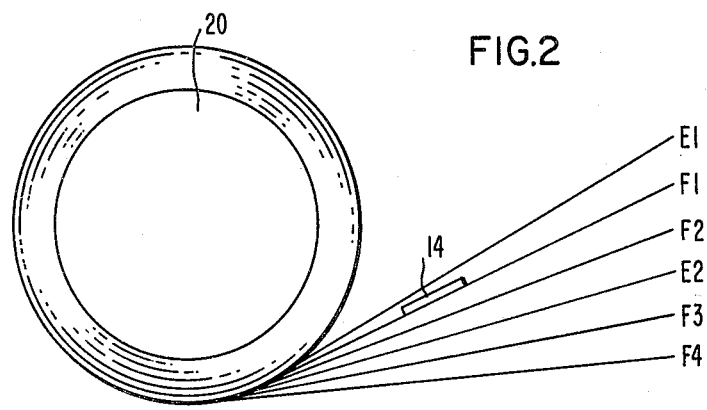
FIG. 2 is a schematic view generally illustrating the formation of a capacitor winding and placement of conductive interconnection elements therein.

Referring to FIG. 1, there are shown a pair of capacitor sections 10 and 11 with a conductive interconnection in accordance with the present invention. The sections each include a pair of foil electrodes and sheets of dielectric material wound together such as in accordance with FIG. 2 illustrating a mandrel 20 on which sheets including a first electrode E1 of, for example, aluminum foil material, a pair of dielectric layers F1 and F2, such as for example film such as polypropylene and/or paper, a second electrode E2 such as aluminum foil and dielectric layers F3 and F4. The windings therefore place dielectric layers F1 and F2 on one side of electrode E1 and between it and E2 while the dielectric layers F3 and F4 are on the other side of E1 between it and E2. It is therefore intended that the foil and dielectric layers are wound conventionally and the variations available for the nature of the foils and the dielectrics are in accordance with known practice.

As shown in FIG. 1, a first of the sections has within it a conductive sleeve 14 which generally comprises a folded piece of foil material. The sleeve 14 is located in the section 10 adjacent one of the electrodes at a location where an interconnection is desired.

The other of the sections 11 of FIG. 1 has within it one end of a conductive tab 16 which may be an essentially flat straight piece of a foil material, but is flexible. This tab is also located in the winding and at a location next to an electrode where an interconnection is desired. The interconnection is completed between the two sections as shown in FIG. 1 by the free end of the conductive tab 16 being disposed within the sleeve 14 of the first section 10.

It is to be understood that in accordance with this invention the location of the points of interconnection, and the number of interconnections formed, may be in accordance with standard practice. The sleeve 14 and conductive tab 16 are each located so that they make pressure contact with an adjacent electrode foil. However, they need not be immediately adjacent the electrode foil as it may be desirable to employ an extra piece of foil material between the interconnection elements and the adjacent electrode or a protective sheet may be used between the interconnecting element 14 or 16 and the adjacent dielectric in order to minimize damage due to burrs or sharp edges of such elements.

Also, it is to be recognized that a sleeve 14 and a tab 16 may be at two locations of the same foil electrode and interconnected to modify the electrical characteristics of the electrode. Whereas previously it was necessary to assemble sections such as those illustrated in FIG. 1, each having a conductor extending from them which are then physically joined such as by soldering at the ends, it is now possible to form the interconnection without any such joining operation and merely by inserting the free end of the conductive tab 16 into the conductive sleeve 14. As shown in FIG. 1, the conductive sleeve 14 extends somewhat from the end of the section roll 10. This is desirable as the primary function of the conductive sleeve 14 is to serve as a locater to permit easy entrance of the conductive tab 16 in a minimum of operator time. In the absence of the conductive sleeve 14 the entry of the tab end would be difficult to achieve properly because the foil electrodes are themselves normally of less width than the dielectric sheets and thus not readily accessible at the ends of the roll.

As shown in FIG. 2, the various sheet materials are drawn off of their individual supplies and wound on the mandrel 20. In the preferred practice of the invention, the winding is initiated in the normal manner and continued to a point at which one of the interconnection elements 14 or 16 is to be placed in the winding. For example, it may be appropriate to wind approximately one-fourth of the total winding, stop the winding machine, and to then place within the sheets a conductive sleeve 14 such as that illustrated adjacent electrode foil E1. The winding is continued then until another point is reached, such as three-fourths of the way through the roll, at which another interconnection element is desired. For example, at that point the winding may be stopped and a straight conductive tab may be inserted adjacent electrode foil E2. While the foregoing practice of placing sleeves and tabs in their desired locations during winding is preferred, it is also possible to insert sleeves and tabs (as well as tabs into sleeves) after winding, but before the section is pressed and wrapped.

Figure 3A:
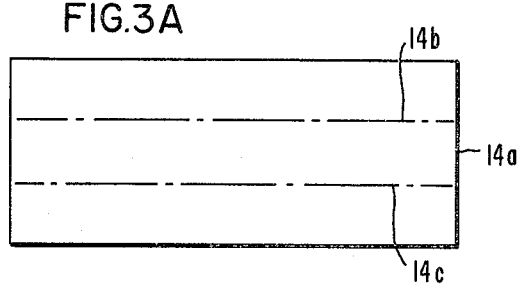
FIG. 3A is a plan view of a conductive foil element prior to forming a conductive sleeve for use in the practice of the invention.
Figure 3B:
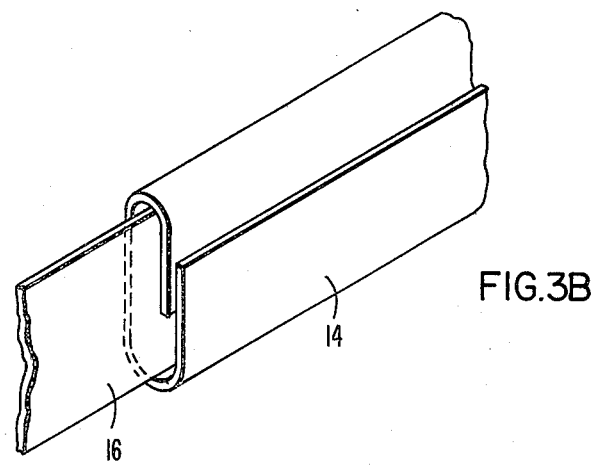
FIG. 3B is a view of a folded conductive sleeve with a conductive tab inserted therein in accordance with the present invention.

The conductive sleeve 14 can be simply a folded piece of foil material similar to that of the capacitor electrodes. As shown in FIG. 3A such a piece of material 14a is folded along lines 14b and 14c to produce the structure as shown in FIG. 3B. FIG. 3B also shows within the conductive sleeve 14 the end of the conductive tab 16 which is located within another capacitor section. The insertion of the tab into the capacitor conductive sleeve is performed after the winding is completed with the interconnection elements 14 and 16 therein. The wound sections are stacked with each other, that is, with other wound sections having appropriately located conductive sleeves and tabs and the interconnections then made by an operator by simply taking the extended tab and inserting it in the extended portion of the sleeve. The tab 16 itself is flexible foil-like material such as the electrode foil material. However, it may be desirable to employ a grade of foil of somewhat greater stiffness to permit easy entry of the tab into the sleeve. For example, one material found suitable is tinned copper foil having a thickness of about 0.005 inch. This insertion is made while the sections are still loose. That is, they are not yet pressed tightly together. After insertion of the interconnections, the sections are then pressed which hold tightly the sleeve and tab elements in their location next to the electrodes so that they cannot be readily displaced. The sections are then wrapped as a group and may be placed in a can or other enclosure. The capacitor sections in the open can are then available for impregnation and completion of the assembly including connection of selected conductive interconnection elements to external terminals which may be performed conventionally.

Figure 4A:
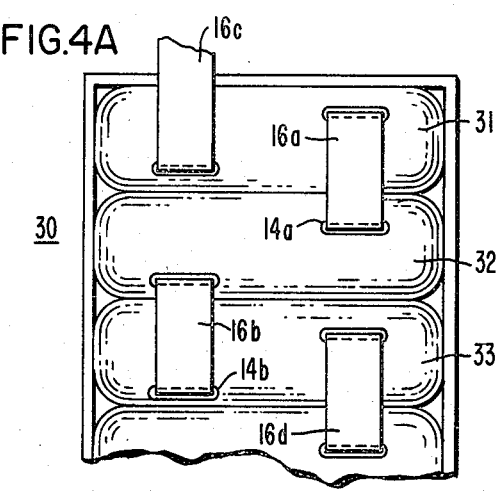
FIG. 4A is a partial end view of an assembled capacitor in accordance with the present invention.
Figure 4B:
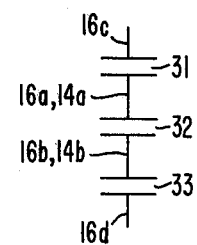
FIG. 4B is an equivalent circuit of FIG. 4A.

FIG. 4A illustrates a partial end view of a capacitor unit 30 including three sections 31, 32 and 33, as shown, and possibly more sections, after they have been stacked and pressed. Merely by way of example, the sections are shown interconnected by the sleeve and tab method of this invention. Section 31 has a tab 16a located within it adjacent one of its electrodes. The same tab has its other end within a sleeve 14a in section 32. Similarly, sections 32 and 33 have electrodes interconnected by tab 16b and sleeve 14b. Additionally shown is tab 16c adjacent the other electrode of section 31 and tab 16d adjacent the other electrode of section 33. These elements therefore provide a serially connected group of sections as shown in FIG. 4B. In practice, of course, the interconnections may achieve various other circuit combinations of the sections.

As shown in FIG. 4A, the excess portion of the conductive sleeve is flattened out on the end of the rolls. In the nature of the windings concerned here, as mentioned, the electrode foil elements are within the edges of the dielectric material so that the spreading out on the end of the roll of portions of the conductive sleeve and the flattening of the conductive tab against the end of the roll is not going to cause shorting of any of the electrodes.

Among variations of the application of this invention is the case in which two or more conductive tabs are at the same location within a section; one tab going to a first other section within a conductive sleeve of that section, a second tab going to a second other section within a sleeve in that section and a third tab proceeding to an external terminal of the device. In a typical power capacitor of six sections, eight interconnections may be used between various different pairs of sections.

It is therefore seen that the invention provides a simple to implement configuration and method for forming conductive interconnections between sections of a multisection capacitor. By the use of a continuous conductive tab physical joining adjacent the roll end is avoided, such as may require expensive interconnection components or heating which could cause fusing of dielectric film material and resultant impairment of impregnability.

I claim:

1. A multi-section capacitor comprising: a plurality of sections each including a pair of foil electrodes and one or more sheets of dielectric material between said electrodes; means for interconnecting one of said electrodes of a first of said sections to one of said electrodes of a second of said sections comprising a sleeve of conductive foil material disposed at a first location within a first section adjacent one of the foil electrodes of said first section, and a continuous conductive tab in the form of a strip of conductive foil material having a first end disposed at a second location within a second section adjacent one of the foil electrodes of said second section and a second end disposed in said sleeve.

2. A multi-section capacitors comprising: a plurality of wound capacitor sections in an enclosure having a pair of terminals extending through the enclosure, each capacitor section comprising a pair of foil electrodes and one or more sheets of dielectric material between said electrodes; each of said wound sections having at least a first sleeve of conductive foil material disposed there within adjacent one of said pair of electrodes; a plurality of conductive foil tabs for electrically connecting said sections with each other, each tab being a unitary foil strip in contact at one end with an electrode of one section and within said one section and having its other end disposed in said sleeve of another of said sections.

3. A capacitor in accordance with claim 2 wherein: said dielectric material of said capacitor sections comprises a sheet of plastic film adjacent an electrode, said film being susceptible of damage if thermally bonded interconnections between sections were used.

4. A capacitor in accordance with claim 3 wherein: said plastic film is polypropylene.

5. A method of manufacturing a multi-section capacitor comprising:
 winding elongated sheets of dielectric material intermediate a pair of conductive foil electrodes to form a roll;
 placing, during said winding, a conductive foil tab at one location in the roll in conductive contact with one of said pair of electrodes;
 placing, during said winding, a sleeve of conductive foil material in the roll in conductive contact with the other of said pair of electrodes at a second location in the roll;
 completing the winding of said roll;
 winding at least a second roll of dielectric material and foil electrodes and placing a conductive foil tab and a sleeve of conductive foil material therein in like manner as for said first roll;
 stacking said rolls;
 inserting the free end of the tab of one roll into the sleeve of another roll; and
 pressing and wrapping the stacked and interconnected sections.

* * * * *